June 22, 1954 E. E. KUHARY ET AL 2,681,536
STALK SHREDDER AND ADJUSTING MECHANISM THEREFOR
Filed Feb. 25, 1953 3 Sheets-Sheet 3
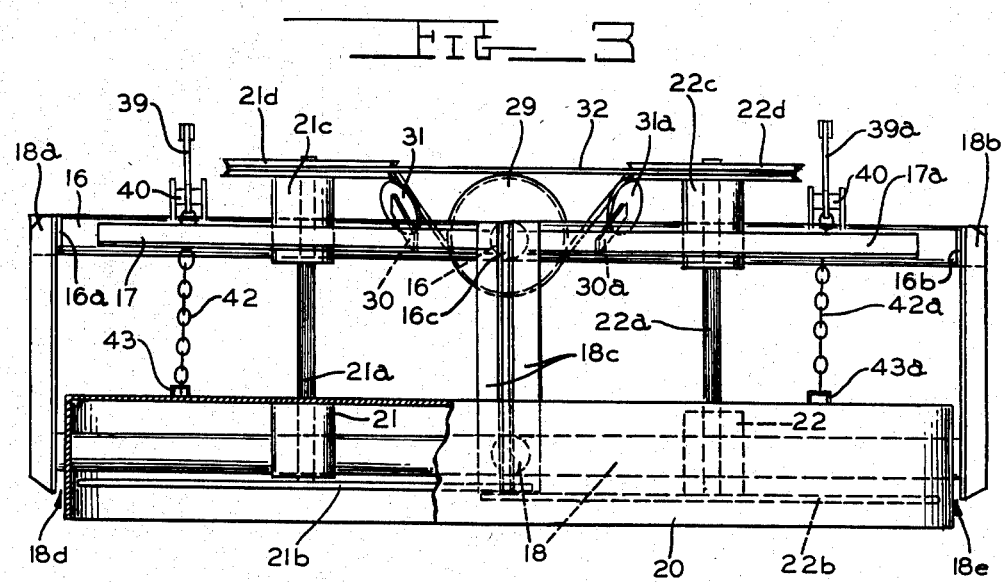
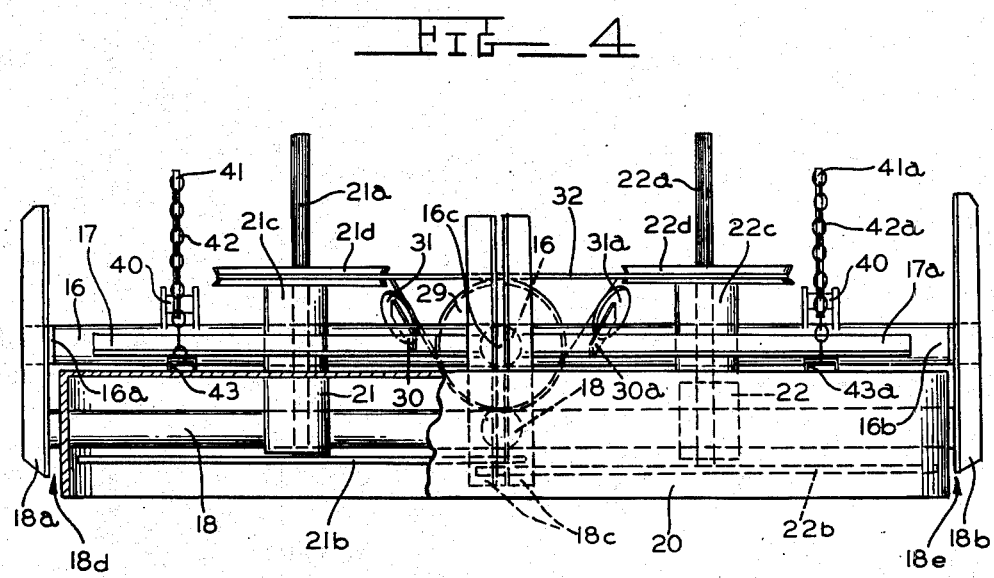
INVENTORS
EMERY E. KUHARY &
FREDERICK D. SAWYER
BY
AND
ATTORNEYS Patented June 22, 1954

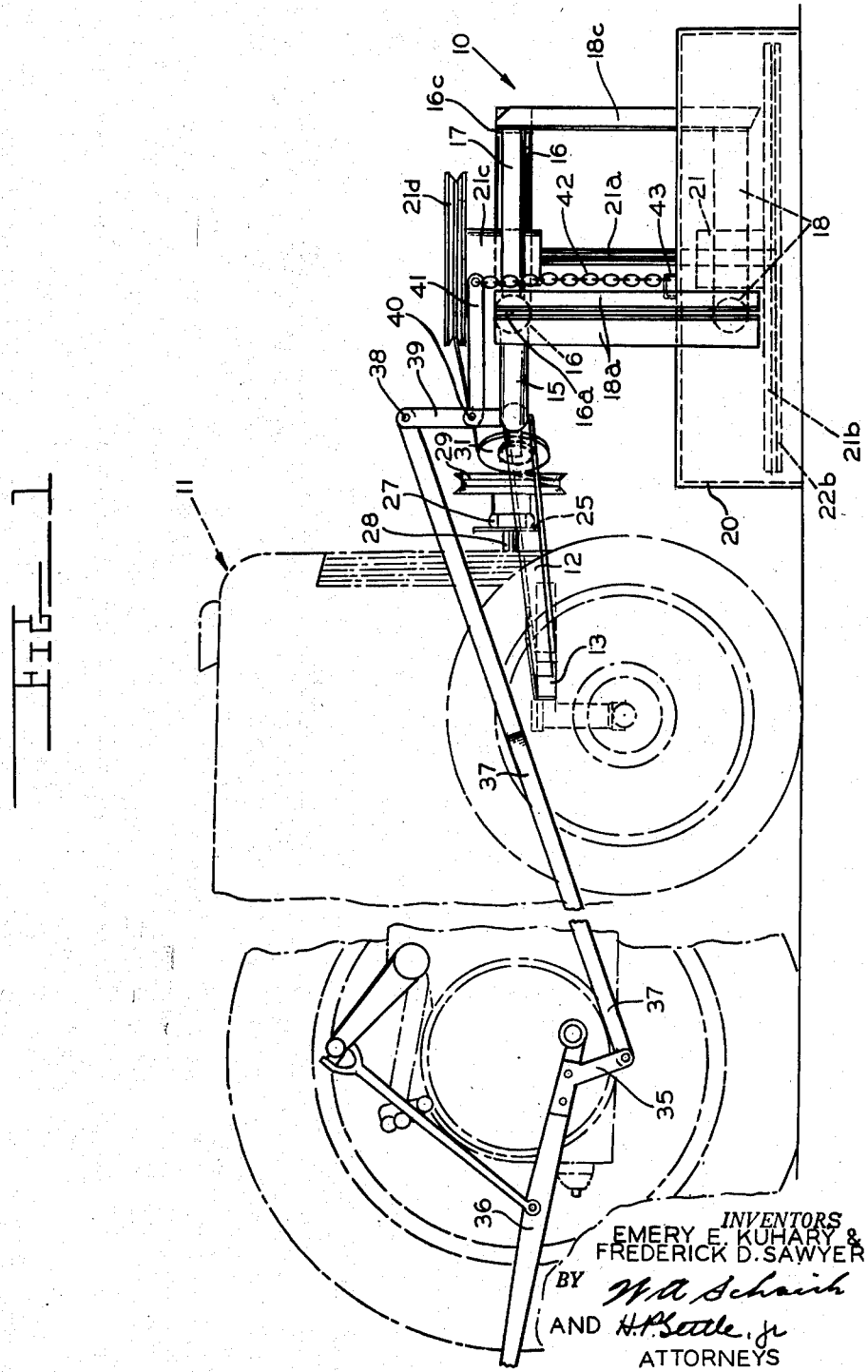

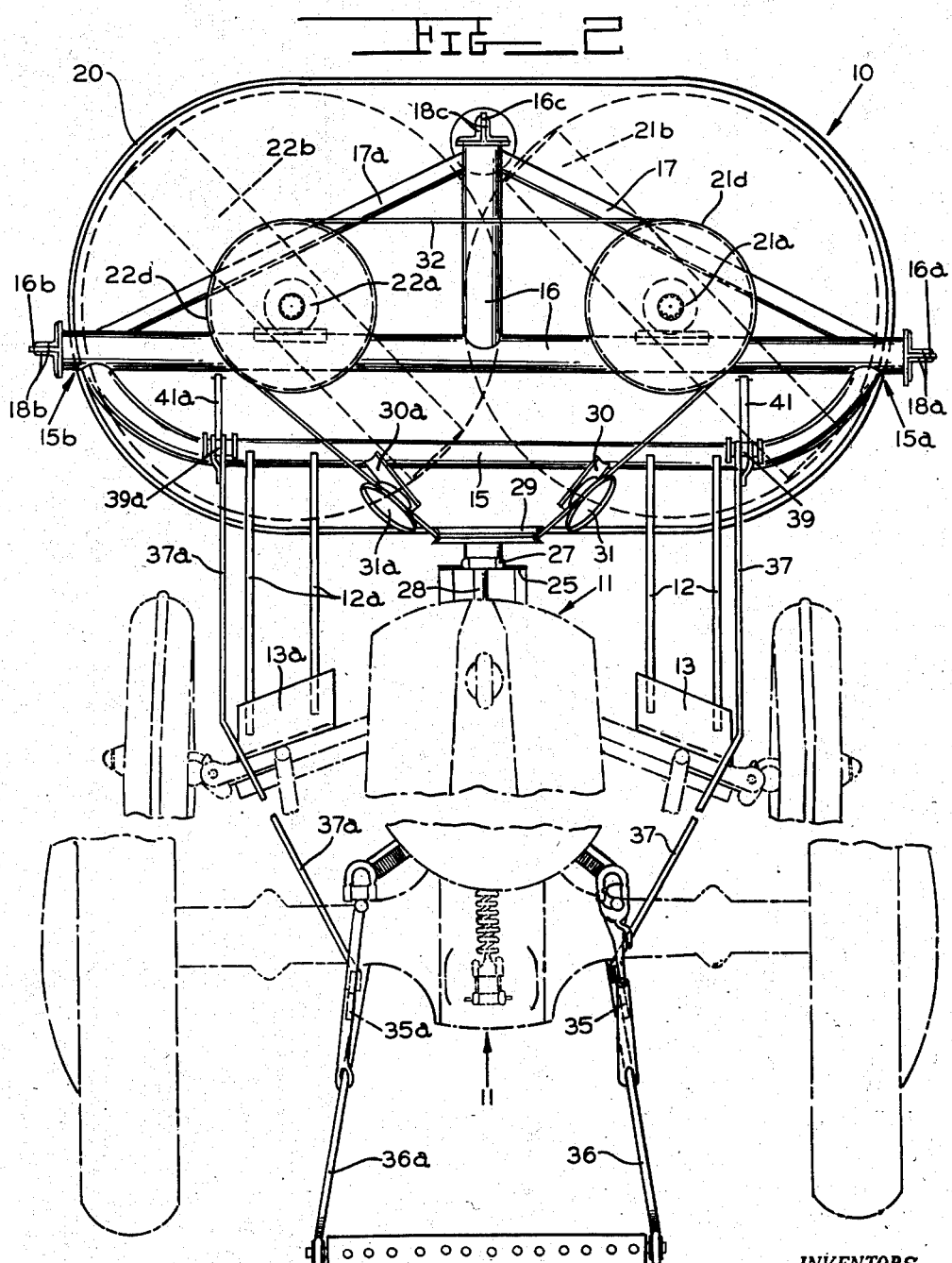

2,681,536

UNITED STATES PATENT OFFICE 2,681,536

STALK SHREDDER AND ADJUSTING MECHANISM THEREFOR

Emery E. Kuhary, Royal Oak, and Frederick D. Sawyer, Birmingham, Mich., assignors, by mesne assignments, to Ford Motor Company, Dearborn, Mich., a corporation of Delaware Application February 25, 1953, Serial No. 338,684

3 Claims. (Cl. 55—62)

This invention relates to a front mounted rotary stalk shredder for tractors. In one aspect this invention relates to a front mounted rotary stalk shredder for tractors having a trailing three-point linkage for connection to power liftable implements. In a further aspect this invention relates to a front mounted stalk shredder adapted to vertical movement by actuation of a trailing implement lift mechanism.

This invention provides a novel front mounted rotary stalk shredder comprised of a pair of horizontally rotating blades and a shield enclosing said blades, said assembly being adapted to vertical movement by actuation of the trailing draft links of the tractor's implement suspension system.

More particularly, the stalk shredder of the present invention is comprised of a pair of rotating blades surrounded by a hood, the entire assembly being mounted in a novel manner for vertical movement and adapted to be driven from the front end of the crankshaft of a tractor.

It is, therefore, an object of the present invention to provide a novel front mounted stalk shredder for tractors having trailing three-point linkages for connection to power liftable implements.

Another object of the present invention is to provide a front mounted stalk shredder for tractors, said shredder being adapted to receive power from the front end of the crankshaft of the tractor engine.

A further object of the present invention is to provide a front mounted rotary stalk shredder which is adapted to be vertically moved by linkages connecting said shredder and the trailing draft links of tractors having trailing power liftable implement suspension systems.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side view of a tractor of well-known make, illustrating the stalk shredder of the present invention mounted thereon;

Figure 2 is a plan view of a tractor of well-known make, illustrating the stalk shredder of the present invention mounted thereon;

Figure 3 is a front view of the shredder of the present invention with parts in fragmentary section, showing the shredder in a lower operating position; and Figure 4 is a front view of the shredder of the present invention with parts in fragmentary section, showing the shredder in a raised operating position.

As shown on the drawings:

In Figures 1 and 2, reference numeral 10 refers to the rotary stalk shredder of the present invention attached to a tractor 11 of well-known make by means of the bracket elements 12 and 12a, which brackets are rigidly secured to the front axle of the tractor by suitable means such as bolts. As shown in Figure 2, these bracket members are comprised of angle iron portions 13 and 13a to which are suitably secured, such as by welding, the support arms 12 and 12a, which project to a point forward of the tractor and support the frame from which the cutting head and guard, to be later described, are suspended.

As further shown in Figure 2, the supporting framework of the stalk shredder is comprised of a generally U-shaped member 15, rigidly secured, as by welding, to the T-shaped tubular member 16, as at points 15a and 15b. Braces 17 and 17a are secured, as by welding, to said T-shaped member between the body and the cross arm to provide rigid construction. At the outermost ends of the T-frame 16 are welded steel guide plates 16a and 16b and 16c, which coact with mating sliding members of the blade and guard frame assembly for controlled vertical movement thereof.

The blade and guard assembly and the supporting framework therefor can best be described by reference to Figures 1 and 3, which show side and front views respectively of the mechanism. The frame comprises a T-shaped tubular member 18 which resembles the T-shaped main frame 16, above it. To the outermost ends of frame 18 are welded angle members 18a, 18b and 18c which slide vertically past the mating guide members 16a, 16b and 16c of the upper main frame 16. Bearings 21 and 22 are suitably mounted, as by welding, to T-frame 18 and carry the shafts 21a and 22a. Suitably secured to the lower ends of shafts 21a and 22a are the rotating blades 21b and 22b, which are slightly vertically displaced, one above the other, to provide clearance therebetween. The tip peripheries of these blades overlap slightly to cut a clean swath and thus the necessity of slight vertical displacement for clearance.

Bearings 21c and 22c are welded to the cross arm of T-frame 16 and are superpositioned in vertical alignment with bearings 21 and 22, respectively. Thus shaft 21a is journaled in bearings 21 and 21c and shaft 22a is journaled in bearings 22 and 22c. A sheet metal guard 20 is secured, as by welding, to frame number 18 at points 18d and 18e and surrounds blades 21b and 22b.

Power is supplied to the present shredder from the tractor engine by means of a power-take-off pulley attached to the front end of the crankshaft. As shown in Figure 2, U-shaped bracket 25 is bolted to the tractor frame, and carries bearing 27 at its outer end for the support of the crankshaft extension 28, secured to the crankshaft by known means, such as a sleeve, or the like. Driving pulley 29 is secured in a conventional manner, such as by means of a Woodruff key or the like, to the outer end of said crankshaft extension 28. Plates 30 and 30a are fastened, as by welding, to tubular frame member 15 and provide support for transfer pulleys 31 and 31a and their respective shafts and bearings of conventional configuration. The pulleys 21d and 22d are fastened to the inner race of bearings 21c and 22c, respectively. These pulley bores and the bearing races are splined internally and said splines match mating splines on the upper portions of shafts 21a and 22a. Thus shafts 21a and 22a are slidably mounted within said bearings and pulleys 21c—21d and 22c—22d. A belt of suitable configuration, such as a V-belt, is wrapped about driving pulley 29, transfer pulleys 31 and 31a and driven pulleys 21d and 22d. Thus power is transmitted from the tractor engine crankshaft via belt 32 and the associated pulleys to shafts 21a and 22a and thus to blades 21b and 22b.

To vary the cutting height of the blades, a lift mechanism is provided which is actuated by the trailing draft links of the tractor's implement suspension system. One-half of this lift mechanism is shown in Figure 1 wherein a bracket member 35 of substantial L-shape is bolted or otherwise rigidly fastened to the liftable tractor draft link 36. A connecting member 37 is pivotally secured to bracket 35 and extends forward along the side of tractor 11 to point 38 where it is pivotally attached to bell crank 39. The bell crank 39 is also pivotally attached to top frame member 15 of the shredder frame, as at point 40. The forwardly projecting arm 41 of bell crank 39 has a hole drilled in its outer end and a chain 42 is suspended therefrom and welded at its other end as at 43 to the sheet metal guard 20. The other half of the lifting mechanism is shown in the plan view provided in Figure 2 and comprises bracket 35a, connecting member 37a, bell crank 39a with its forwardly projecting lift arm 41a, and chain 42a, assembled, as described above, on the opposite side of the tractor to draft link 36a and the shredder.

Thus upon actuation of the tractor's hydraulic system, the draft link 36 will be raised and bracket 35 will be pulled rearwardly, also pulling connecting member 37 rearwardly, thus imparting vertical movement to arm 41 of bell crank 39. This causes chain 42 to be lifted and with it are lifted the sheet metal housing, floating T-frame 18, cutter bars 21b and 22b, etc. Shafts 21a and 22a slide upwardly through the splined races of bearings 21c and 22c. As the floating cutter head and guard assembly is raised, it is guided for vertical movement by angle members 18a and 18b and 18c, which slide past the mating guide members 16a, and 16b and 16c, which are secured to the outer ends of main frame 16. Thus the cutting height of the shredder can be changed while the blades are rotating and such change can be effected while the tractor is in motion or at rest, as desired.

The advantages of the present shredder will be obvious to those skilled in the art. For example, the present shredder is mounted at the front of the tractor in full view of the driver for his convenience of operation and guidance as he moves the tractor forward. The cutting height of the present shredder is readily adjusted by the driver from the convenience of the tractor seat by operation of the tractor's built-in implement lifting mechanism. The operator need only move a lever by the flick of a finger to change the cutting height of the mechanism. The operator can readily change the cutting height while the cutter blades are in motion and while the tractor is in motion or at rest, as desired.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having an engine, the improvement of an implement adjusting structure, said structure including a main frame, means for rigidly attaching said main frame to said tractor, a subframe suspended from and linearly, vertically movable with respect to said main frame, co-acting guide means on said main frame and said subframe, a vertical shaft, means rotatably journaling said shaft at its lower end on said subframe, and means slidably, rotatably journaling said shaft at its upper end on said main frame, a rotatable implement mounted on the bottom end of said shaft beneath said subframe, a shield rigidly secured to said subframe in overlying, surrounding relation to said rotatable implement, means operatively connecting said shaft to said tractor engine, and means for lifting said subframe, whereby linear, vertical movement is imparted to said subframe, said implement and said shield.

2. For use with a tractor having an engine and a power-lifted draft link, the improvement of an implement adjusting structure, said structure including a horizontally disposed, generally T-shaped main frame, wherein the cross arm of said T is laterally disposed with relation to the direction of travel of said tractor and the stem of said T projects forward from the center of said cross arm, means for securing said main frame to said tractor, a bell crank supported on said main frame for vertical pivotal movement, a vertically movable subframe, said subframe corresponding in configuration to and underlying said main frame, a vertical shaft, means rotatably journaling said shaft at its lower end on said subframe, and means slidably, rotatably journaling said shaft at its upper end on said main frame, a rotatable implement mounted on the bottom end of said shaft beneath said subframe, a shield secured to said subframe in overlying surrounding relation to said rotatable implement, means operatively connecting said shaft to said tractor engine, support means connecting one arm of said bell crank and said subframe, coacting guide members rigidly secured to the extremities of said main frame and said subframe, said guide means being adapted to maintain a linear, vertically movable relation between said frames, and means for connecting said tractor draft link and the other arm of said bell crank, whereby upon actuation of said draft link, linear, vertical movement is imparted to said subframe, said implement and said shield.

3. The combination defined in claim 2 wherein said main frame has vertically disposed, plate-like guide members rigidly secured to each of its outer ends and said subframe has laterally spaced pairs of vertically disposed angle iron guide members rigidly secured to and extending above each of its outer ends, said angle iron guide members being disposed to coact with said vertically disposed guide plates on said main frame, whereby upon actuation of said tractor draft links, linear vertical movement is imparted to said subframe.

References Cited in the file of this patent

UNITED STATES PATENTS

| Number | Name | Date |
|---|---|---|
| 1,442,032 | Luce et al. | Jan. 9, 1923 |
| 2,305,254 | Hirschkorn | Dec. 15, 1942 |
| 2,388,411 | Hicks | Nov. 6, 1945 |
| 2,466,555 | Paine et al. | Apr. 5, 1949 |
| 2,483,683 | Wells et al. | Oct. 4, 1949 |